3,287,100
METHOD FOR CONTROLLING UNDESIRED PLANT GROWTH

Otto Rohr, Neu-Allschwil, Hans Aebi, Riehen, and Ludwig Ebner, Stein, Aargau, Switzerland, assignors to Ciba Limited, Basel, Switzerland, a Swiss company
No Drawing. Filed Sept. 5, 1963, Ser. No. 306,688
Claims priority, application Switzerland, Sept. 12, 1962, 10,824/62
7 Claims. (Cl. 71—2.3)

The present invention provides preparations for controlling undesired plant growth. These preparations contain as active principle a compound of the general formula

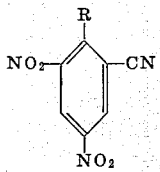

(I)

where R represents a hydroxyl group, a lower alkoxy radical or the group

in which $R_1$ and $R_2$ are identical or different and each represents a hydrogen atom, a lower alkyl or hydroxyalkyl radical, and one or more of the following additives: Solvents, diluents, dispersing or wetting agents, adhesives, fertilizers or other pesticides.

The compounds of the general formula

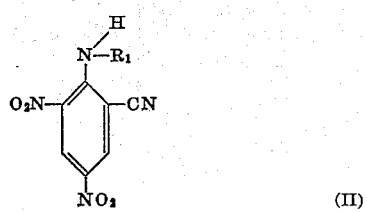

(II)

in which $R_1$ represents a hydrogen atom, a lower alkyl radical with 1 to 4 carbon atoms or a hydroxyethyl group are distinguished by an especially potent action against undesired plant growth.

The invention further includes the use of the compounds of the above Formulae I and II for controlling undesired plant growth.

It is a special advantage of the active principles of the above Formulae I and II and of the preparations containing these active principles that they can be used not only as total herbicides but in a suitable concentration also as selective herbicides. Thus, for example, it is possible to control successfully undesired plant growth in cultivated areas of agricultural products such, for example, as sugarbeet, spinach, bush beans, soya beans without these agricultural plants themselves suffering any appreciable damage.

The preparations of the invention may take a large variety of forms for their application. Solutions of the compounds of the general Formulae I and II for direct spraying may be made, for example, with petroleum fractions of a medium to high boiling range, preferably those boiling above 100° C, such, for example, as diesel oil or kerosene, coal tar oils and oils of vegetable or animal origin, as well as hydrocarbons, such, for example, as alkylated naphthalenes, tetrahydronaphthalene, if desired, in admixture with xylene mixtures, cyclohexanols, ketones, or chlorinated hydrocarbons such, for example, as trichloroethane, tetrachloroethane, trichloroethylene, trichlorobenzenes or tetrachlorobenzenes.

The preparation may be made up in aqueous form, for example, by adding water to emulsion concentrates, pastes or wettable spray powders. Suitable emulsifying or dispersing agents are, for example, non-ionic products, for example condensation products of ethylene oxide with aliphatic alcohols, amines or carboxylic acids containing a long-chain hydrocarbon radical with about 10 to 20 carbon atoms, such, for example, as the condensation product of octadecyl alcohol and 25 to 30 mols of ethylene oxide, or of soya bean fatty acid and 30 mols of ethylene oxide, or of commercial oleylamine and 15 mols of ethylene oxide, or of dodecylmercaptan and 12 mols of ethylene oxide. As suitable anionic emulsifiers there may be mentioned the sodium salt or dodecyl alcohol sulphuric acid ester, the sodium salt of dodecylbenzenesulphonic acid, the potassium or triethanolamine salt of oleic acid or of abietic acid or of mixtures of these two acids, or the sodium salt of a petroleum-sulphonic acid. Suitable cationic dispersing agents are quaternary ammonium compounds, such, for example, as cetyl pyridinium bromide or dihydroxyethyl benzyl dodecyl ammonium chloride.

For the manufacture of dusting and scattering preparations there may be used as solid carrier talcum, kaolin, bentonite, calcium carbonate, calcium phosphate, or coal, cork meal, wood meal or other materials of vegetable origin. It is very advantageous to manufacture the preparations in granulated form. The diverse forms of application may contain the conventional additives that improve the distribution, the adhesion, the stability towards rain or the penetration; as such substances there may be mentioned fatty acids, resins, glue, casein or alginates.

The preparations of the invention may be used by themselves or in admixture or conjunction with conventional pesticides, especially insecticides, acaricides, nematocides, bactericides or other fungicides or herbicides.

Weeds to be controlled with the preparations of the invention include also undesired agricultural plants which may have been sown on the field to be treated at an earlier period. The preparations may be used by the post-emergence as well as by the pre-emergence method. They can be applied in amounts varying e.g. from 5 to 20 kgs. and preferably 10 to 20 kgs./hectare.

The active principles of the above Formulae I and II can be manufactured by methods as such known. An example of a particularly advantageous manufacturing method is described below:

1. 2-CYANANISOLE FROM ORTHO-ANISIDINE (a) A solution of 123 g. of ortho-anisidine (=1 mol) in 250 cc. of water and 250 cc. of concentrated sulphuric acid is mixed with about 750 g. of ice and diazotized with 250 cc. of 4 N-sodium nitrite solution.

(b) 125 g. of crystalline copper sulphate are dissolved in water and made up to 500 cc. This solution is stirred slowly into a solution of 140 g. of sodium cyanide and 58.5 cc. of concentrated ammonia (20 percent) in 450 cc. of water so that the temperature does not rise above 50 to 60° C. 500 cc. of toluene are then added to the resulting clear, brown solution and the whole is heated in a water bath to 90–95° C. While stirring the whole well, the prepared solution of diazotized ortho-anisidine is then added dropwise in the course of about 4 to 6 hours. The batch is then allowed to cool, filtered, the filter residue is washed on the suction filter with a small amount of toluene, and the dark-colored toluene layer is separated from the aqueous solution in a separating funnel. After drying over sodium sulphate the toluene is distilled off under reduced pressure, and the residue is subjected to distillation in a high vacuum.

Boiling point: 106° C. under 1.5 mm. Hg pressure; yellow oil. Yield: 95 g.=71%.

Boiling point: 78–82° C. under 0.01 mm. Hg pressure. $n_D^{25}$: 1.5456.

2. 2-CYANO-4:6-DINITRANISOLE FROM 2-CYANANISOLE 133 g. of 2-cyananisole (=1 mol) are dissolved at 0° C. in 460 g. of 98% sulphuric acid and then, while being stirred and cooled to −5° C. to +5° C., nitrated within 1 hour with 264 g. of mixed acid 1:1 (concentrated sulfuric acid/concentrated nitric acid). The batch is stirred for ½ hour longer, during which the temperature may be allowed to rise to 20° C., and the resulting mixture is then poured over 1200 g. of ice, filtered, washed with water until neutral and dried under vacuum at 40–50° C.

Melting point 55–65° C. (after recrystallization: 70° C.). Yield: 190 g.=85%.

3. 2-CYANO-4:6-DINITRANILINE FROM 2-CYANO-4:6-DINITRANISOLE 233 g. of 2-cyano-4:6-dinitranisole (=1 mol) are dissolved in 1000 cc. of alcohol while being heated to 55° C., and 170 cc. of concentrated ammonia (20%) are then vigorously stirred in rather rapidly drop by drop. The reaction is exothermic and the temperature rises to about 70° C., and the yellow 2-cyano-4:6-dinitraniline precipitates. The batch is heated to the boiling temperature of the alcohol and then allowed to cool. The product is suctioned off and dried under vacuum at 60–70° C. It melts at 217–218° C. Yield: 198 g.=95%.

When 2-cyano-4:6-dinitranisole is reacted in a similar manner with the corresponding amine, the following derivatives of 2-cyano-4:6-dinitraniline are obtained:

TABLE 1

| No. | Active Principle | Melting at ° C. |
|---|---|---|
| 4 | O₂N—⬡(NHCH₃)(CN)—NO₂ | 158–160 |
| 5 | O₂N—⬡(NHC₂H₅)(CN)—NO₂ | 118–120 |
| 6 | O₂N—⬡(NHCH₂CH₂OH)(CN)—NO₂ | 121–123 |
| 7 | O₂N—⬡(NHCH(CH₃)₂)(CN)—NO₂ | 79–80 |

TABLE I—Continued

| No. | Active Principle | Melting at ° C. |
|---|---|---|
| 8 | O₂N—⬡(N(CH₃)₂)(CN)—NO₂ | 157–159 |
| 9 | O₂N—⬡(OH)(CN)—NO₂ | 175–176 |

The present invention includes also the new compounds of the general formula

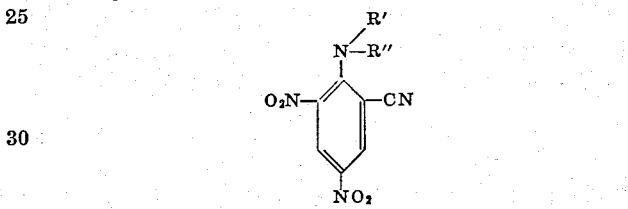

where R′ represents a hydrogen atom or a lower alkyl radical and R″ a lower alkyl radical, with the proviso that when R′ represents hydrogen, R″ must contain at least 3 carbon atoms, and more especially the new compounds Nos. 7 and 8 shown in the above table.

The following examples illustrate the invention, parts and percentages in the preceding specification and in the examples are by weight.

Example 1

A spray powder was prepared from the following ingredients:

20% of 2-cyano-4:6-dintraniline,
50% of bolus alba (kaolin),
25% of finely dispersed silica (product marketed under the trade name "Hisil"),
3.5% of a condensation product of 1 mol of dodecylmercaptan and 12 mols of ethylene oxide,
1.5% of a condensation product of para-nonyl-phenol and 9 mols of ethylene oxide.

The resulting, finely ground mixture can be diluted with water in any desired proportion to form a spray broth ready for use.

Example 2

(a) The following plants were sown in earthenware pots: Lactuca sativa, Daucus carota, Brassica rapa, Dactylis glomerata, Poa trivialis, Alopecurus myosuroides, Beta vulgaris, Spinacea oleracea, Soja max and Phaseolus vulgaris. 2 days after seeding the earth in the pots was superifically treated with a spray broth, prepared as described in Example 1, containing 2-cyano-4:6-dinitraniline. The amount of active principle applied corresponded to 20 kg. per hectare. 22 days after the treatment all plants with the exception of Beta vulgaris, Spinacea oleracea, Phaseolus vulgaris and Soja max had died off or had been so extensively damaged that they could no longer recover.

(b) The same plants as listed under (a) above were prepared in an identical manner for the experiment, but the treatment was performed 10 to 12 days after seeding when the first foliage leaf pair had developed. The plants were sprayed with a broth, prepared as described in Example 1, containing 2-cyano-4:6-dinitraniline. The amount of active principle applied corresponded to 20 kg. per hectare.

20 days after the treatment the plants mentioned above, except for *Beta vulgaris* and *Spinacea oleracea*, had died off completely or had been almost completely destroyed so that they could no longer recover. *Soja max, Phaseolus vulgaris* and *Spinacea oleracea* were only very slightly inhibited in their growth, whereas *Beta vulgaris* was not inhibited at all in its growth.

When applied under the test conditions described in Examples 2(a) and (b), the active principles Nos. 4 to 7 in Table 1 displayed results quite similar to those described in Examples 2(a) and (b). A distinct herbicidal effect was also observed with the active principles Nos. 8 and 9 in Table 1.

What is claimed is:

1. The method for controlling undesired plant growth, wherein there is applied to the area where the said effect is desired a herbicidal amount of an active compound of the formula

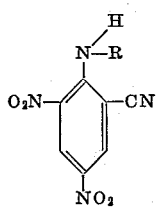

wherein R represents a member selected from the group consisting of hydrogen, lower alkyl and the hydroxyethyl radical.

2. The method for controlling undesired plant growth, wherein there is applied to the area where the said effect is desired a herbicidal amount of an active compound of the formula

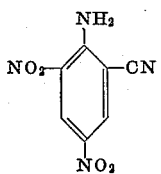

3. The method for controlling undesired plant growth, wherein there is applied to the area where the said effect is desired a herbicidal amount of an active compound of the formula

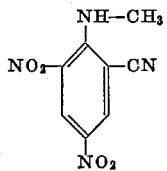

4. The method for controlling undesired plant growth, wherein there is applied to the area where the said effect is desired a herbicidal amount of an active compound of the formula

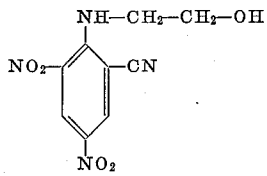

5. The method for selectively killing undesired plant growth in crop areas, wherein there is applied to the crop area a compound of the formula

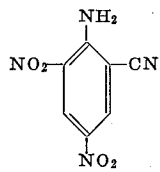

in an amount which is sufficient to control the undesired plant growth but does not prevent the growth of the crops.

6. The method for selectively killing undesired plant growth in crop areas, wherein there is applied to the crop area a compound of the formula

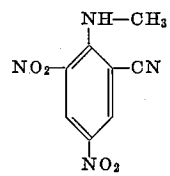

in an amount which is sufficient to control the undesired plant growth but does not prevent the growth of the crops.

7. The method for selectively killing undesired plant growth in crop areas, wherein there is applied to the crop area a compound of the formula

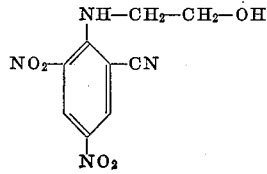

in an amount which is sufficient to control the undesired plant growth but does not prevent the growth of the crops.

References Cited by the Examiner

UNITED STATES PATENTS

| | | | |
|---|---|---|---|
| 2,978,310 | 4/1961 | Daams et al. | 71—2.3 |
| 3,027,248 | 3/1962 | Koopman et al. | 71—2.3 |
| 3,050,544 | 8/1962 | Pietrusza et al. | 260—465 |
| 3,097,227 | 7/1963 | Williams | 260—465 |

FOREIGN PATENTS 902,586 8/1962 Great Britain.

LEWIS GOTTS, *Primary Examiner.*

J. O. THOMAS, *Assistant Examiner.*